United States Patent
Ku et al.

(10) Patent No.: US 12,151,939 B2
(45) Date of Patent: Nov. 26, 2024

(54) CARBON NANOTUBE FIBER HAVING IMPROVED PHYSICAL PROPERTIES AND METHOD FOR MANUFACTURING SAME

(71) Applicant: KOREA INSTITUTE OF SCIENCE AND TECHNOLOGY, Seoul (KR)

(72) Inventors: Bon Cheol Ku, Wanju-Gun (KR); Jun Yeon Hwang, Wanju-Gun (KR); Hyeon Su Jeong, Wanju-Gun (KR); Nam Ho You, Wanju-Gun (KR); Nam Dong Kim, Wanju-Gun (KR); Dae Yoon Kim, Wanju-Gun (KR); Dong Ju Lee, Wanju-Gun (KR); Seo Gyun Kim, Wanju-Gun (KR); Seung Ki Hong, Wanju-Gun (KR); Seung Woo Ryu, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 557 days.

(21) Appl. No.: 17/387,305

(22) Filed: Jul. 28, 2021

(65) Prior Publication Data

US 2022/0227631 A1    Jul. 21, 2022

(30) Foreign Application Priority Data

Jan. 18, 2021 (KR) ................ 10-2021-0006762

(51) Int. Cl.
*C01B 32/168* (2017.01)
*D01D 5/12* (2006.01)
*D01F 9/12* (2006.01)

(52) U.S. Cl.
CPC ............ *C01B 32/168* (2017.08); *D01D 5/12* (2013.01); *D01F 9/12* (2013.01)

(58) Field of Classification Search
CPC ... C01B 32/168; C01B 32/158; C01B 32/159; C01B 32/16; C01B 32/162;
(Continued)

(56) References Cited

U.S. PATENT DOCUMENTS

2007/0065975 A1    3/2007 Smalley et al.
2014/0363669 A1*   12/2014 Otto ..................... C01B 32/168
                                                       252/502
2020/0055734 A1    2/2020 Oh et al.

FOREIGN PATENT DOCUMENTS

KR    10-2014-0059843 A    5/2014
KR    10-2019-0013343 A    2/2019
KR         20190013343  *  2/2019  ........... C01B 32/166

OTHER PUBLICATIONS

Scholz, et al., Systematic Investigations of Annealing and Functionalization of Carbon Nanotube Yarns, Molecules 2020; 25: 1144, pp. 1-14 (Year: 2020).*
Machine Translation of KR 20190013343 to Jeong, et al. (Year: 2019).*
Kim, et al., Surface modifications for the effective dispersion of carbon nanotubes in solvents and polymers, Carbon 2012; 50: 3-33 (Year: 2012).*

(Continued)

*Primary Examiner* — Daniel C. McCracken
(74) *Attorney, Agent, or Firm* — Birch, Stewart, Kolasch & Birch, LLP

(57) ABSTRACT

The present disclosure relates to a carbon nanotube fiber having improved physical properties and a method for manufacturing the same. The method according to the present disclosure comprises the steps of: spinning carbon nanotubes with a purity of 90% by weight or more to obtain a first carbon nanotube fiber; and heat-treating the first carbon nanotube fiber at 500 to 3,000° C. under an inert gas atmosphere to obtain a second carbon nanotube fiber, wherein the second carbon nanotube fiber has a density of 1.0 to 2.5 g/cm³.

10 Claims, 13 Drawing Sheets

T_Pristine (Comparative Example 1)

T_1400°C (Example 1)

T_1700°C (Example 2)

T_2000°C (Example 3)

T_2400°C (Example 4)

T_2700°C (Example 5)

(58) Field of Classification Search
CPC ..... C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D01D 5/12; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133; C01P 2006/10; C01P 2006/32; D10B 2401/063

See application file for complete search history.

(56) References Cited

OTHER PUBLICATIONS

Zhang, et al., Macroscopic Fibers of Well-Aligned Carbon Nanotubes by Wet Spinning, Small 2008; 4(8): 1217-1222 (Year: 2008).*

Ericson, et al., Macroscopic, Neat, Single-Walled Carbon Fibers, Science 2004; 305: 1447-1450 (Year: 2004).*

Choi, et al., Advances in liquid crystalline nano-carbon materials: preparation of nano-carbon based lyrotropic liquid crystal and their fabrication of nano-carbon fibers with liquid crystalline spinning, Carbon Letters 2015; 16(4): 223-232 (Year: 2015).*

Scholz et al., "Systematic investigations of annealing and functionalization of carbon nanotube yarns", Molecules, 2020, vol. 25, No. 1144, pp. 1-14.

* cited by examiner

CARBON NANOTUBE FIBER HAVING IMPROVED PHYSICAL PROPERTIES AND METHOD FOR MANUFACTURING SAME

CROSS-REFERENCE TO RELATED APPLICATIONS

Pursuant to 35 U.S.C. § 119 (a), this application claims the benefit of Korean Patent Application No. 10-2021-0006762, filed on Jan. 18, 2021, the contents of which are all hereby incorporated by reference herein in their entirety.

BACKGROUND OF THE DISCLOSURE

Field of the Disclosure

The present disclosure relates to a carbon nanotube fiber having improved physical properties and a method for manufacturing the same.

Related Art

Although individual carbon nanotubes have excellent mechanical properties, electrical properties, and thermal properties, their practical application is limited due to dispersibility issues.

A fibrous carbon nanotube aggregate which exists in a continuous phase rather than a particle form like individual carbon nanotubes, that is, carbon nanotube fibers, does not have problems such as the difficulty of dispersion of carbon nanotubes in the form of particles, and it has an advantage that it can be used in various ways by making it in the form of a one-dimensional fiber as it is or a two-dimensional fabric. Further, since the carbon nanotube fibers have a density as low as $\frac{1}{5}$ of those of metals such as copper or aluminum, the carbon nanotube fibers are very effective in manufacturing light and strong materials such as materials in the field of ultra-light composite materials. However, despite these advantages, the carbon nanotube fibers have a disadvantage in that they cannot express physical properties, such as strength, elastic modulus, and electrical conductivity of individual carbon nanotubes composing the carbon nanotube fibers, as they are.

With the methods for manufacturing carbon nanotube fibers known to date, physical properties of the carbon nanotube fibers do not reach a satisfactory level, and improvements are required.

SUMMARY

An object of the present disclosure is to provide a carbon nanotube fiber having improved physical properties and a method for manufacturing the same.

The object of the present disclosure is achieved by a method for manufacturing a carbon nanotube fiber, the method comprising the steps of: spinning carbon nanotubes with a purity of 90% by weight or more to obtain a first carbon nanotube fiber; and heat-treating the first carbon nanotube fiber at 500 to 3,000° C. under an inert gas atmosphere to obtain a second carbon nanotube fiber, wherein the second carbon nanotube fiber has a density of 1.0 to 2.5 g/cm$^3$.

The first carbon nanotube fiber may have a density of 0.6 to 2.3 g/cm$^3$, and the second carbon nanotube fiber may have a density of 1.5 to 2.5 g/cm$^3$.

The carbon nanotubes may be single-walled carbon nanotubes, and the heat treatment temperature may be 1,000 to 2,100° C.

The second carbon nanotube fiber may have a carbon nanotube diameter 1.02 to 1.5 times that of the first carbon nanotube fiber.

At least a portion of the carbon nanotubes may be graphitized by the heat treatment.

The carbon nanotubes may include 20 to 100% by weight of double-walled carbon nanotubes, and the heat treatment temperature may be 2,200 to 3,000° C.

The second carbon nanotube fiber may have a specific tensile modulus 2 to 10 times that of the first carbon nanotube fiber, and the second carbon nanotube fiber may have a thermal conductivity 1.1 to 3 times that of the first carbon nanotube fiber.

The heat treatment temperature may be 2,500 to 3,000° C.

The carbon nanotubes may include 20 to 100% by weight of the double-walled carbon nanotubes, and the heat treatment temperature may be 1,000 to 3,000° C.

The carbon nanotubes may include 20 to 70% by weight of the double-walled carbon nanotubes, the heat treatment temperature may be 1,000 to 2,100° C., and the second carbon nanotube fiber may have a carbon nanotube diameter 1.02 to 1.3 times that of the first carbon nanotube fiber.

The heat treatment temperature may be 1,500 to 1,900° C., and the second carbon nanotube fiber may have a specific tensile modulus 1.5 to 5 times that of the first carbon nanotube fiber.

The carbon nanotubes may include 80 to 100% by weight of the double-walled carbon nanotubes, and the heat treatment temperature may be 2,200 to 3,000° C.

The carbon nanotubes may be purified by chemical purification.

The chemical purification may comprise the steps of: (i) treating carbon nanotubes using a strong acid alone or a mixture of the strong acid and hydrogen peroxide or ammonium hydroxide (NH$_4$OH); (ii) removing a metal catalyst in the carbon nanotubes by gas phase reaction of a halogen element compound; or (iii) combining them.

The fiber manufacturing method may be performed by wet spinning, dry spinning, dry-wet spinning, or liquid crystal spinning.

The step of obtaining the first carbon nanotube fiber may comprise a step of liquid crystal spinning or wet spinning a dope containing the carbon nanotubes and a super strong acid.

The super strong acid may be one or more selected from chlorosulfonic acid, sulfuric acid, fuming sulfuric acid, fluorosulfonic acid, trifluoroacetic acid, trifluoromethanesulfonic acid, fluoroantimonic acid, and carborane acid.

The method may further comprise a step of oxidizing the carbon nanotubes by heating the carbon nanotubes under an oxygen atmosphere in order to increase dispersion of the carbon nanotubes in the dope.

The first carbon nanotube fiber may have a specific tensile strength of 0.50 N/tex or more and a specific tensile modulus of 50 N/tex or more.

The object of the present disclosure is achieved by a carbon nanotube fiber having a density of 1.0 to 2.5 g/cm$^3$, a specific tensile strength of 1.0 to 8 N/Tex, a specific tensile modulus of 200 to 1,000 N/Tex, and a thermal conductivity of 100 to 2,000 W/mK.

The carbon nanotube fiber may have a density of 1.5 to 2.5 g/cm$^3$, a specific tensile modulus of 300 to 1,000 N/Tex, and a thermal conductivity of 200 to 1,500 W/mK.

At least a portion of the carbon nanotube fiber may be graphitized, and may have a specific tensile modulus of 400 to 1,000 N/Tex and a thermal conductivity of 300 to 1,500 W/mK.

The carbon nanotubes of the carbon nanotube fiber may include 20 to 100% by weight of the double-walled carbon nanotubes.

DESCRIPTION OF EXEMPLARY EMBODIMENTS

Figure 1:
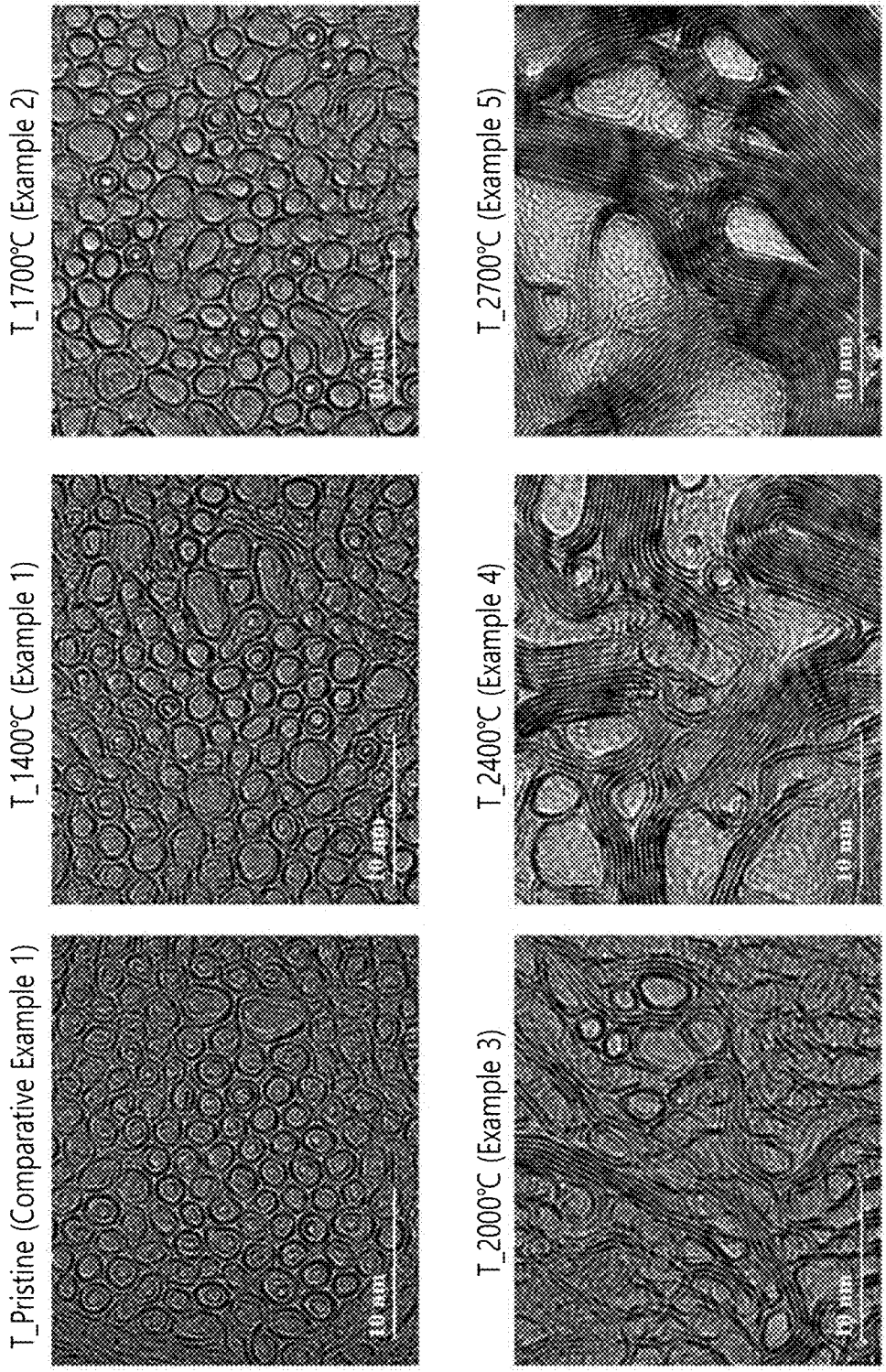
FIG. 1 is transmission electron microscope (TEM) images for each heat treatment temperature of the carbon nanotube fibers manufactured in Comparative Example 1 and Examples 1 to 5.

The present inventive concept described below may have various transformations applied thereto and may have various embodiments, and specific embodiments are illustrated in the drawings and described in detail. However, this is not intended to limit the present inventive concept with respect to specific embodiments, and it should be understood to include all transformations, equivalents, or substitutes included in the technical scope of the present inventive concept.

Terms used below are only used to describe specific embodiments, and are not intended to limit the present inventive concept. The singular expression includes the plural expression unless the context clearly dictates otherwise. Hereinafter, terms such as "comprise" or "have" are intended to indicate that a feature, number, step, operation, constituent element, part, component, material, or a combination thereof described in the specification exists, but it should be understood that the terms do not preclude the existence or addition possibility of one or more other features, numbers, steps, operations, constituent elements, parts, components, materials, or combinations thereof.

In order to clearly express various layers and regions in the drawings, the thicknesses are shown to be enlarged or reduced. Throughout the specification, the same reference numerals are assigned to similar parts. Throughout the specification, when a part, such as a layer, film, region, plate, or the like, is referred to as "on" or "above" other part, it includes not only the case where the part is directly on the other part but also the case where another part is in the middle therebetween. Throughout the specification, although terms such as first, second, etc. may be used to describe various constituent elements, the constituent elements should not be limited by the terms. The terms are used only for the purpose of distinguishing one constituent element from another.

Although the terms such as first, second, etc. may be used to describe various elements, components, regions, layers and/or areas, it will be understood that such elements, components, regions, layers and/or areas should not be limited by these terms.

Further, the processes described in the present disclosure do not necessarily mean that they are applied in order. For example, when a first step and a second step are described, it will be understood that the first step does not necessarily have to be performed prior to the second step.

Hereinafter, a carbon nanotube fiber according to an embodiment and a method for manufacturing the same will be described in detail with reference to the drawings.

A method for manufacturing a carbon nanotube fiber according to an embodiment may comprise the steps of: spinning carbon nanotubes with a purity of 90% by weight or more to obtain a first carbon nanotube fiber; and heat-treating the first carbon nanotube fiber at 500 to 3,000° C. under an inert gas atmosphere to obtain a second carbon nanotube fiber, wherein the second carbon nanotube fiber may have a density of 1.0 to 2.5 g/cm$^3$.

The first carbon nanotube fiber may have a density of 0.6 to 2.3 g/cm$^3$, and the second carbon nanotube fiber may have a density of 1.3 to 2.5 g/cm$^3$, or 1.5 to 2.5 g/cm$^3$.

The method for manufacturing the carbon nanotube fiber not only increases the van der Waals force by performing spinning and coagulation processes of carbon nanotubes with a purity of 90% by weight or more to secure a bundled first carbon nanotube fiber with a density of 0.6 g/cm$^3$ or more, or 0.6 to 2.3 g/cm$^3$, and then further increasing the density by minimizing the gap between the carbon nanotubes through heat treatment, but also enables strength, etc. to be increased by increasing the diameter of the carbon nanotubes through heat treatment.

The number of walls of the carbon nanotubes used for manufacturing the first carbon nanotube fiber may be 1 to 5. The carbon nanotubes may further include single-walled carbon nanotubes (CNTs), double-walled carbon nanotubes (CNTs), multi-walled carbon nanotubes (CNTs), or a combination thereof.

The carbon nanotubes used for manufacturing the first carbon nanotube fiber may include 20 to 100% by weight of the double-walled carbon nanotubes, and the heat treatment temperature may be 2,200 to 3,000° C., or 2,500 to 3,000° C. At this time, the second carbon nanotube fiber may have a specific tensile modulus 2 to 10 times that of the first carbon nanotube fiber, and the second carbon nanotube fiber may have a thermal conductivity 1.1 to 3 times that of the first carbon nanotube fiber.

The carbon nanotubes used for manufacturing the first carbon nanotube fiber may include 20 to 100% by weight of the double-walled carbon nanotubes, and the heat treatment temperature may be 1,000 to 3,000° C.

The carbon nanotubes used for manufacturing the first carbon nanotube fiber may include 20 to 70% by weight of the double-walled carbon nanotubes, and the heat treatment temperature may be 1,000 to 2,100° C. At this time, the second carbon nanotube fiber may have a carbon nanotube diameter 1.02 to 1.3 times that of the first carbon nanotube fiber.

The carbon nanotubes used for manufacturing the first carbon nanotube fiber may include 20 to 70% by weight of the double-walled carbon nanotubes, and the heat treatment temperature may be 1,500 to 1,900° C. At this time, the second carbon nanotube fiber may have a specific tensile modulus 1.5 to 5 times that of the first carbon nanotube fiber.

The carbon nanotubes used for manufacturing the first carbon nanotube fiber may include 80 to 100% by weight of the double-walled carbon nanotubes, and the heat treatment temperature may be 2,200 to 3,000° C. At this time, the second carbon nanotube fiber may have a specific tensile modulus 1.5 to 5 times that of the first carbon nanotube fiber.

The carbon nanotubes may have a purity of 90% by weight or more, and contain impurities such as a metal catalyst in an amount of 10% by weight or less. That is, the carbon nanotubes may contain the impurities in an amount of 10% by weight or less based on the total weight of the carbon nanotubes containing impurities. If the amount of the impurities in the carbon nanotubes is greater than 10% by weight in the process of manufacturing the first carbon nanotube fiber, dispersibility is lowered so that fiber spinning is difficult, and impurities such as a residual metal iron catalyst remain inside the fiber even after spinning so that strength and electrical conductivity of the fiber may be deteriorated. Further, mechanical properties of a finally obtained carbon nanotube fiber may be greatly reduced by increasing defects inside the fiber due to aggregation of the metal catalyst remaining in the carbon nanotube fiber when heat-treating a carbon nanotube fiber at 500° C. or higher if there are many impurities.

Carbon nanotubes with a purity of 90% by weight or more may be obtained by chemically purifying a carbon nanotube raw material.

Chemical purification not only can control the purity of the carbon nanotubes to 90% by weight or more, but also enables a high-concentration liquid crystal spinning process to be performed by functionalizing the carbon nanotube surface during the chemical purification process, thereby improving dispersibility of the carbon nanotubes. Through this, highly oriented, bundled fibers can be manufactured, and since the gap between the carbon nanotubes is narrowed so that the van der Waals force is increased, a carbon nanotube fiber with more improved specific tensile strength and specific tensile modulus can be provided.

After controlling the purity of the carbon nanotubes to 90% by weight or more through chemical purification, a first carbon nanotube fiber having a density of 0.6 g/cm$^3$ or more, a specific tensile strength of 0.5 N/tex or more, or 0.5 to 4.0 cN/tex, and a specific tensile modulus of 50 N/tex or more, or 50 to 250 N/tex may be obtained by spinning the purity-controlled carbon nanotubes, and a second carbon nanotube fiber having improved physical properties may be obtained by heat-treating the first carbon nanotube fiber at 500° C. or higher.

As a chemical purification method, for example, (i) it is possible to treat the carbon nanotubes by using a strong acid such as sulfuric acid, nitric acid, hydrochloric acid, etc. alone or by using a mixture of the strong acid and hydrogen peroxide, ammonium hydroxide ($NH_4OH$), or the like. Further, the method may comprise a process of removing the metal catalyst in the carbon nanotubes by gas phase reaction of a halogen element compound such as chlorine, fluorine, or the like. Processes combining these are also possible.

A first carbon nanotube fiber having a density of 0.6 g/cm$^3$ or more may be obtained by spinning carbon nanotubes with a purity of 90% by weight or more.

The spun fiber may include a fiber obtained by wet spinning, dry spinning, dry-wet spinning, or liquid crystal spinning.

The first carbon nanotube fiber may have a density of 0.6 g/cm$^3$ or more, for example, 0.6 to 2.3 g/cm$^3$, preferably 1.0 to 2.0 g/cm$^3$. A carbon nanotube fiber having improved specific tensile strength, specific tensile modulus, and conductivity may be obtained through heat treatment continued in the above range.

The first carbon nanotube fiber having a density of 0.6 g/cm$^3$ or more may have an average diameter of 10 to 100 μm.

According to an embodiment, the step of obtaining the first carbon nanotube fiber having a density of 0.6 g/cm$^3$ or more may comprise a step of liquid crystal spinning or wet spinning a dope containing the carbon nanotubes and a super strong acid.

A dope is prepared by dispersing the carbon nanotubes in the super strong acid as a solvent. Although the super strong acid may include, for example, one or more selected from chlorosulfonic acid, sulfuric acid, fuming sulfuric acid, fluorosulfonic acid, trifluoroacetic acid, trifluoromethanesulfonic acid, fluoroantimonic acid ($HSbF_6$), and carborane acid, it is not limited thereto, and may include super strong acids or general chemical solvents commonly used in the art. The dope may be prepared by mixing purified carbon nanotubes and a super strong acid to obtain a mixture, and then performing a process of mechanically stirring the mixture. Mechanical stirring may be performed in a stirring speed range of about 50 to 30,000 rpm.

The dope may have a carbon nanotube concentration of 5 to 100 mg/mL. Smooth spinning may be carried out in the above range.

In the dope, the carbon nanotubes may exhibit a lyotropic nematic phase, and these liquid crystal-forming properties may be useful in increasing the mechanical, electrical, and thermal properties of the obtained carbon nanotube fiber.

Prior to dope preparation, the carbon nanotubes may be oxidized by heating the carbon nanotubes under an oxygen atmosphere in order to increase dispersion of the carbon nanotubes in the dope. For example, after oxidizing the carbon nanotubes by heating the carbon nanotubes under an oxygen atmosphere in a range of 400 to 700° C. for about 10 minutes to 8 hours, the oxidized carbon nanotubes may be used in dope preparation.

The spun fiber may include a fiber obtained by wet spinning, dry spinning, dry-wet spinning, or liquid crystal spinning.

In wet spinning, a filament-like first carbon nanotube fiber may be obtained by allowing solidification due to diffusion of a solvent to be proceeded while a discharged filament short fiber or multiple fiber is passing through a coagulation bath with a length of about 10 to 100 cm after directly spinning the dope, which is a spinning undiluted solution, into the coagulating solution through a spinneret immersed in a coagulating solution. Thereafter, the first carbon nanotube fiber is wound on a winding roller.

In the case of dry-wet spinning, the spinneret is installed in the air to be separated by a certain distance (for example, 1 to 100 mm, specifically 10 to 50 mm) from the surface of the coagulating solution so that the filaments are allowed to be immersed in the coagulating solution after moving the filaments by a certain length in the air before filaments discharged from the spinneret are immersed in the coagulating solution. In the case of using dry-wet spinning, the filaments receive more tension than those in wet spinning so that a fiber having high orientation degree and density may be obtained.

In the case of dry spinning, processes of drying the bundled fibers after bundling fibers synthesized through dry spinning using a usual floating catalyst-chemical vapor deposition (FC-CVD) method through a post-treatment process for bundling the fibers are included.

In the spinning process, the dope, which is the spinning undiluted solution, may be in a temperature range of about 20° C. to about 100° C., preferably about 30° C. to about 80° C.

The coagulating solution is a non-solvent capable of diffusing the solvent while solidifying the first carbon nanotube fiber. A coagulation bath composition that can be used may include, for example, the following systems: dimethyl ether, diethyl ether, sulfuric acid, acetone, acetonitrile, chloroform, methanol, ethanol, N-methylmorpholine-N-oxide (NMMO), dimethyl formamide (DMF), N,N-dimethyl acetamide (DMAc), and dimethyl sulfoxide (DMSO). These may be used alone or in combination of two or more thereof as a coagulation bath. The coagulating solution is, for example, 5% aqueous sulfuric acid solution, 96% sulfuric acid, DMF, DMS, DMAc, or a mixed solution thereof.

Thereafter, a filament-like first carbon nanotube fiber which has passed through the coagulating solution is washed with water, and the filament-like first carbon nanotube fiber which has been washed with water is drawn and wound while passing the filament-like first carbon nanotube fiber through a hot water bath and a thermal drawing furnace. The orientation of the carbon nanotubes in the filaments is increased in the axial direction by the winding tension of filaments during the spinning process, as the filaments pass through the coagulation bath, solidification of the filaments occurs so that the filaments are bundled again, and densification of the filaments occurs, and manufacturing of the first carbon nanotube fiber is completed by solidifying the filaments in this state. At this time, the orientation degree and density of the carbon nanotubes may be adjusted by adjusting a ratio of the spinneret discharge speed and the winding roller rotation speed (spin-draw ratio), that is, the tension. In general, as the spin-draw ratio increases, the orientation degree and density increase.

Stretching may be carried out at a ratio of 1.0 to 10.0, and may be carried out, for example, at a ratio of 2.0 to 6.0. When stretching is carried out in the above range, a first carbon nanotube fiber having excellent specific tensile strength and specific tensile modulus may be obtained.

After stretching, a cleaning process using a solvent such as acetone or water may be performed. A step of drying a spun product at a temperature of 200° C. or less may be performed.

Subsequently, the method for manufacturing the carbon nanotube fiber may obtain a carbon nanotube fiber (second carbon nanotube fiber) which not only minimizes the gap between the carbon nanotubes, thereby further increasing the density of the carbon nanotubes to increase the van der Waals force, but also increases the diameter of the carbon nanotubes to increase strength, etc. by heat-treating a first carbon nanotube fiber at 500° C. or higher under an inert gas atmosphere.

The diameter of the carbon nanotubes may be increased by 2% or more by heat treatment.

The heat treatment may be performed at 500° C. or higher under an inert gas atmosphere, and may be performed, for example, at 500 to 3,000° C., 1,000 to 2,700° C., and 2,000 to 2,400° C. Although the heat treatment time varies depending on the heat treatment temperature, the heat treatment may be performed, for example, for 1 to 60 minutes after reaching the final temperature. The heat treatment may include continuous heat treatment as well as batch-type heat treatment.

The heat treatment forms an inert gas atmosphere using an inert gas including nitrogen, argon, helium, or a combination thereof.

The heat treatment may include batch-type or continuous-type heat treatment performed in a conventional heating furnace, post-treatment such as Joule heating or microwave treatment for performing heat treatment for a short time, and a combination thereof. In addition, tension may be applied during heat treatment.

A highly-densified carbon nanotube fiber may be obtained as carbon nanotube fibers are bundled in the process of performing heat treatment under the above-described conditions. Further, the carbon nanotube fiber finally obtained through the Van der Waals force or chemical crosslinking reaction may have increased specific tensile strength and specific tensile modulus.

The second carbon nanotube fiber thus obtained may have a density of 1.0 to 2.5 g/cm$^3$, a specific tensile strength of 1.0 to 8 N/Tex, and a specific tensile modulus of 200 to 1,000 N/Tex, and a thermal conductivity of 100 to 2,000 W/mK.

The second carbon nanotube fiber thus obtained may have a density of 1.5 to 2.5 g/cm$^3$, a specific tensile modulus of 300 to 1,000 N/Tex, and a thermal conductivity of 200 to 1,500 W/mK.

At least a portion of the second carbon nanotube fiber is graphitized, and may have a specific tensile modulus of 400 to 1,000 N/Tex and a thermal conductivity of 300 to 1,500 W/mK.

The carbon nanotubes of the second carbon nanotube fiber may include 20 to 100% by weight of the double-walled carbon nanotubes.

The carbon nanotube fiber obtained in the present disclosure may be used as a functional composite material to be usefully applied to next-generation new technologies and new materials such as wearable devices, electric, electronic, and bio fields as well as structural composite materials.

Exemplary embodiments are described in more detail through the following examples and comparative examples. However, the examples and comparative examples are for illustrating the technical idea, and the scope of the present disclosure is not limited thereto.

Comparative Example 1: Manufacturing of Carbon Nanotube Fiber

Carbon nanotubes used were single-walled carbon nanotubes (SWCNTs) of Tuball™ (OcSiAl), and oxidation by heat was performed on the carbon nanotubes at 600° C. for 1 hour. Chemical purification was additionally performed on the oxidized carbon nanotubes in order to obtain carbon nanotubes with a high purity. The carbon nanotubes oxidized by heat at 600° C. were purified while stirring the carbon nanotubes for 5 hours by using a piranha (P) solution in which 98% sulfuric acid ($H_2SO_4$) and 30% hydrogen peroxide ($H_2O_2$) were mixed in a volume ratio of 7:3 as a purification solution. After washing sufficiently the purified carbon nanotubes with distilled water and acetone, the washed carbon nanotubes were dried in a vacuum oven of 80° C. for 12 hours or more.

A dope was prepared by dispersing the carbon nanotubes purified as above to a concentration of 30 mg/mL in chlorosulfonic acid (CSA). After dispersing the carbon nanotubes in the prepared dope for one day or more, the prepared dope was spun using a syringe. Spinning was performed using a needle having a diameter of 0.26 mm, and the fiber was spun in a state that the fiber had a draw ratio of about 2.0 or more. A first carbon nanotube fiber having a density of 1.5 g/cm$^3$ was manufactured by using acetone in both a coagulation tank and a water washing tank, carrying out water washing for 2 hours, and finally drying the spun fiber in a vacuum oven of 170° C. for one day or more in order to evaporate CSA inside the spun fiber.

Comparative Example 2: Manufacturing of Carbon Nanotube Fiber

A dope was prepared by dispersing carbon nanotubes manufactured by Meijo Nano Carbon Co., Ltd in Japan to a concentration of 8 mg/mL in chlorosulfonic acid (CSA). In EC-DX2 carbon nanotube used at this time, the weight ratio of single-walled carbon nanotubes (SWCNTs) to double-walled carbon nanotubes (DWCNTs) was 55:45. The carbon nanotubes used were oxidized by heat at 400° C. for 6 hours in order to increase the dispersion effect. A first carbon nanotube fiber was manufactured by using the same other conditions as in Comparative Example 1.

Comparative Example 3: Manufacturing of Carbon Nanotube Fiber

A double-walled carbon nanotube (DWCNT) fiber was purchased from DexMat™ in the United States.

Example 1: Manufacturing of Carbon Nanotube Fiber

The first carbon nanotube fiber manufactured according to Comparative Example 1 was heat-treated using a heating furnace. Since the first carbon nanotube fiber was oxidized during heat treatment if air was present inside the heating furnace, the vacuum was maintained to 10$^{-3}$ torr before heat treatment, and nitrogen or argon gas was filled inside the heating furnace. Nitrogen was flown into the heating furnace at a rate of 20 sccm. The heat treatment was performed by increasing the temperature to about 1,400° C. at a temperature increasing rate of 3 to 10° C./min. A second carbon nanotube fiber was manufactured by maintaining the temperature at a temperature of about 1,400° C. for 30 minutes and cooling the first carbon nanotube fiber naturally in a state in which nitrogen or argon gas was flowing.

Example 2: Manufacturing of Carbon Nanotube Fiber

A second carbon nanotube fiber was manufactured in the same manner as in Example 1 except that the heat treatment was performed at 1,700° C.

Example 3: Manufacturing of Carbon Nanotube Fiber

A second carbon nanotube fiber was manufactured in the same manner as in Example 1 except that the heat treatment was performed at 2,000° C.

Example 4: Manufacturing of Carbon Nanotube Fiber

A second carbon nanotube fiber was manufactured in the same manner as in Example 1 except that the heat treatment was performed at 2,400° C.

Example 5: Manufacturing of Carbon Nanotube Fiber

A second carbon nanotube fiber was manufactured in the same manner as in Example 1 except that the heat treatment was performed at 2,700° C.

Example 6: Manufacturing of Carbon Nanotube Fiber

A second carbon nanotube fiber was manufactured by manufacturing the first carbon nanotube fiber according to Comparative Example 2 and performing the heat treatment in the same manner as in Example 1.

Example 7: Manufacturing of Carbon Nanotube Fiber

A second carbon nanotube fiber was manufactured in the same manner as in Example 6 except that the heat treatment was performed at 1,700° C.

Example 8: Manufacturing of Carbon Nanotube Fiber

A second carbon nanotube fiber was manufactured in the same manner as in Example 6 except that the heat treatment was performed at 2,000° C.

Example 9: Manufacturing of Carbon Nanotube Fiber

A second carbon nanotube fiber was manufactured in the same manner as in Example 6 except that the heat treatment was performed at 2,400° C.

Example 10: Manufacturing of Carbon Nanotube Fiber

A second carbon nanotube fiber was manufactured in the same manner as in Example 6 except that the heat treatment was performed at 2,700° C.

Example 11: Manufacturing of Carbon Nanotube Fiber

A second carbon nanotube fiber was manufactured by manufacturing the first carbon nanotube fiber according to Comparative Example 3 and performing the heat treatment in the same manner as in Example 1.

Example 12: Manufacturing of Carbon Nanotube Fiber

A second carbon nanotube fiber was manufactured in the same manner as in Example 11 except that the heat treatment was performed at 1,700° C.

Example 13: Manufacturing of Carbon Nanotube Fiber

A second carbon nanotube fiber was manufactured in the same manner as in Example 11 except that the heat treatment was performed at 2,000° C.

Example 14: Manufacturing of Carbon Nanotube Fiber

A second carbon nanotube fiber was manufactured in the same manner as in Example 11 except that the heat treatment was performed at 2,400° C.

Example 15: Manufacturing of Carbon Nanotube Fiber

A second carbon nanotube fiber was manufactured in the same manner as in Example 11 except that the heat treatment was performed at 2,700° C.

Evaluation Example 1: Transmission Electron Microscope (TEM) Evaluation for Each Heat Treatment Temperature Transmission electron microscope (TEM) images for each heat treatment temperature of the single-walled carbon nanotube fibers manufactured in Comparative Example 1 and Examples 1 to 5 are shown in FIG. 1.

As shown in FIG. 1, the single-walled CNTs show strength improvements of 1.8 to 2.1 times compared to before heat treatment as single-walled CNTs merge with each other so that large-diameter CNTs and collapsed CNTs are formed at 2,000° C. or lower. It is shown that CNTs start to change into the form of a graphitic structure at 2,000° C. or higher so that the specific tensile strength decreases again. It is shown that the CNTs exist in the form of the graphitic structure at 2,700° C. so that the elastic modulus and thermal conductivity increase by 1.3 times and 1.19 times respectively compared to before heat treatment.

Evaluation Example 2: Transmission Electron Microscope (TEM) Evaluation for Each Heat Treatment Temperature Transmission electron microscope (TEM) images for each heat treatment temperature of the carbon nanotube fibers in which the ratio of single-walled CNTs to double-walled CNTs was 55:45 manufactured in Comparative Example 2 and Examples 6 to 10 are shown in FIG. 2.

Figure 2:
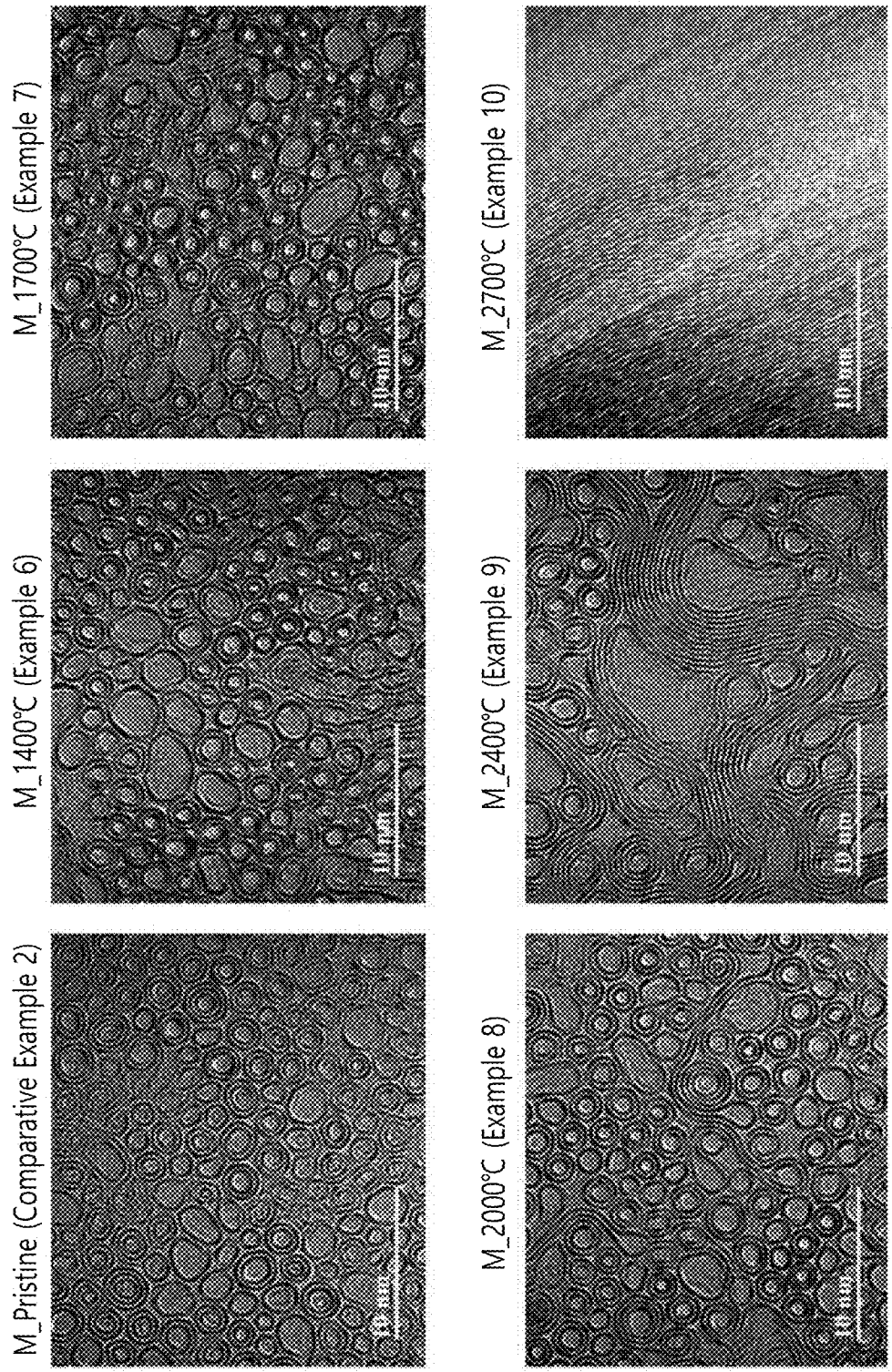
FIG. 2 is graphs showing changes in carbon nanotube (CNT) diameters for each heat treatment temperature of the carbon nanotube fibers manufactured in Comparative Example 2 and Examples 6 to 10.

As shown in FIG. 2, CNTs with the ratio of the single-walled CNTs to the double-walled CNTs of 55:45 show strength improvements of 1.3 to 2.0 times compared to before heat treatment as the single-walled CNTs merge with each other at 2,000° C. or lower so that large-diameter CNTs and collapsed CNTs are formed. It is shown that the CNTs start to change into the form of a graphitic structure at 2,000° C. or higher so that the specific tensile strength decreases again. It is shown that the CNTs exist in the form of a graphitic structure without an empty space (pores) at 2,700° C. so that the elastic modulus increases by 2.9 times compared to before heat treatment.

Evaluation Example 3: Transmission Electron Microscope (TEM) Evaluation for Each Heat Treatment Temperature Transmission electron microscope (TEM) images for each heat treatment temperature of the double-walled carbon nanotube fibers manufactured in Comparative Example 3 and Examples 11 to 15 are shown in FIG. 3.

Figure 3:
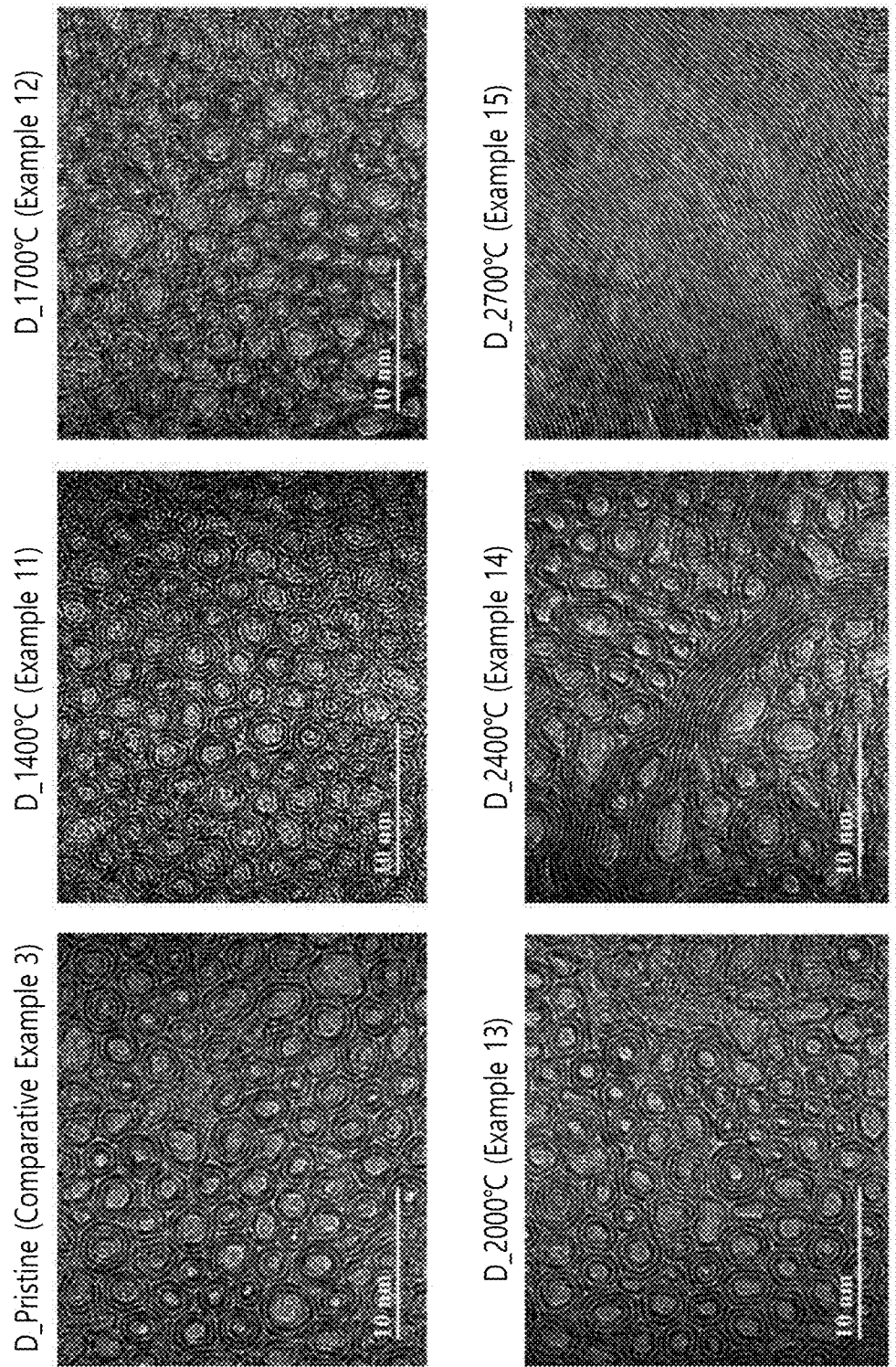
FIG. 3 is graphs showing changes in carbon nanotube (CNT) diameters for each heat treatment temperature of the carbon nanotube fibers manufactured in Comparative Example 2 and Examples 11 to 15.

As shown in FIG. 3, the double-walled CNTs show strength improvements of 1.3 times compared to before heat treatment as the diameter of a small amount of the single-walled CNTs is increased at 2,000° C. or lower. It is shown that the CNTs start to change into the form of a graphitic structure at 2,000° C. or higher so that the specific tensile strength decreases again. It is shown that the CNTs exist in the form of a graphitic structure without an empty space (pores) at 2,700° C. so that the elastic modulus increases by 6.6 times compared to before heat treatment.

Evaluation Example 4: Transmission Electron Microscope (TEM) Evaluation for Each Heat Treatment Temperature Graphs showing changes in CNT diameters for each heat treatment temperature of the carbon nanotube fibers manufactured in Comparative Examples 1 to 3 and Examples 1 to 15 are shown in FIGS. 4A to 6B.

Figure 4A:
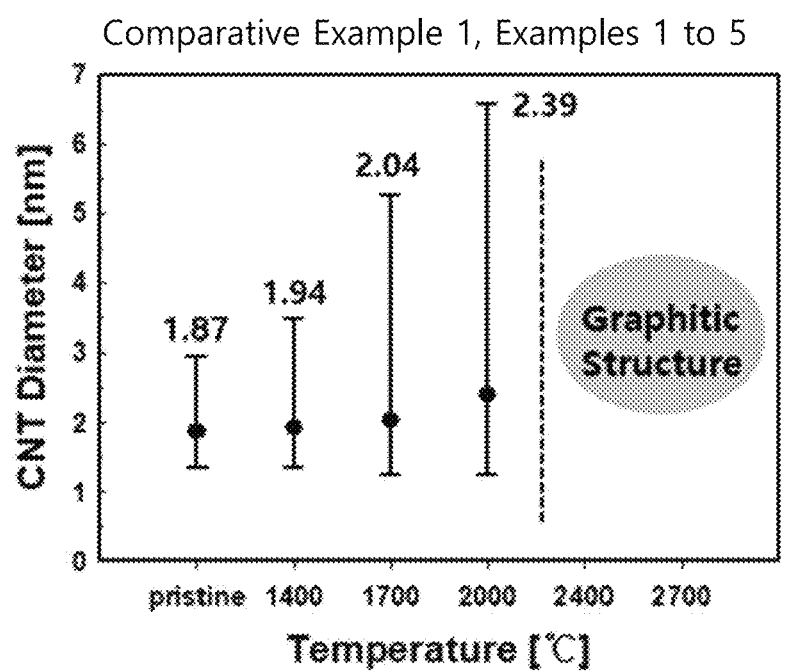
FIG. 4A and FIG. 4B show changes in carbon nanotube diameters for each heat treatment temperature of the carbon nanotube fibers manufactured in Comparative Example 1 and Examples 1 to 5.
Figure 4B:
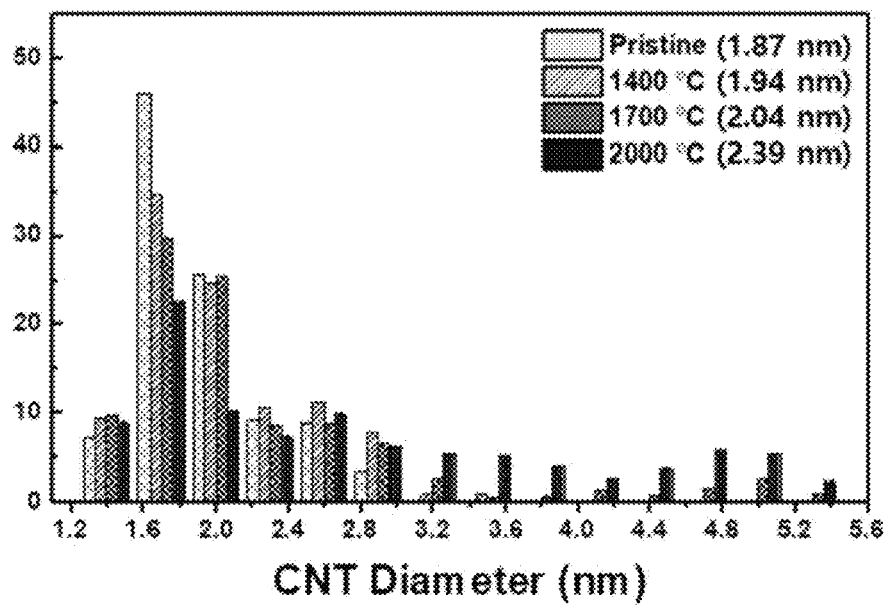
Figure 6A:
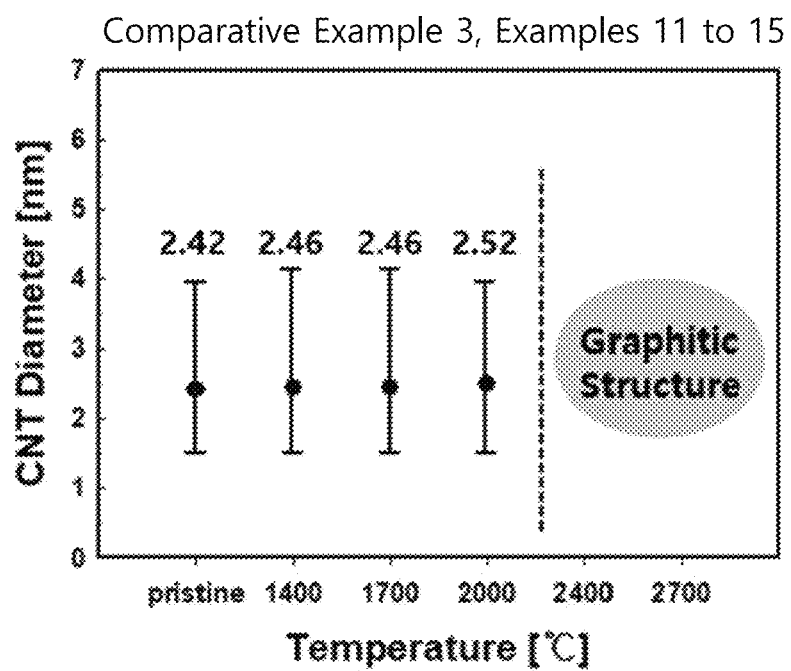
FIG. 6A and FIG. 6B show changes in carbon nanotube diameters for each heat treatment temperature of the carbon nanotube fibers manufactured in Comparative Example 2 and Examples 11 to 15.
Figure 6B:
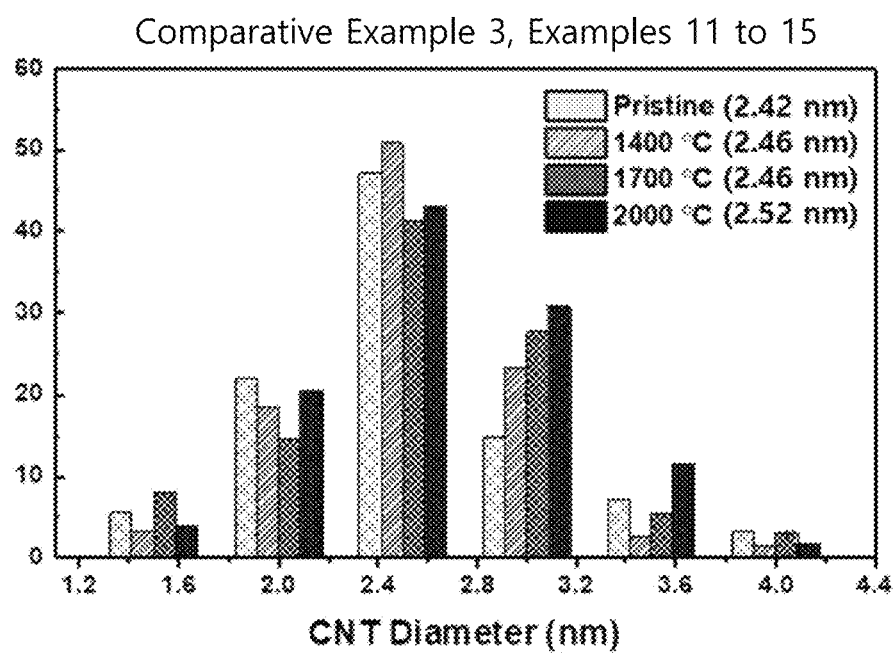

As shown in FIGS. 4A and 4B, it can be seen that an increase range in the CNT diameters increases as the heat treatment temperature increases. It can be seen that, when the single-walled CNTs are the majority, the diameters increase according to heat treatment, whereas when the double-walled CNTs are the majority, there are little changes in the diameters as shown in FIGS. 6A and 6B.

Figure 5A:
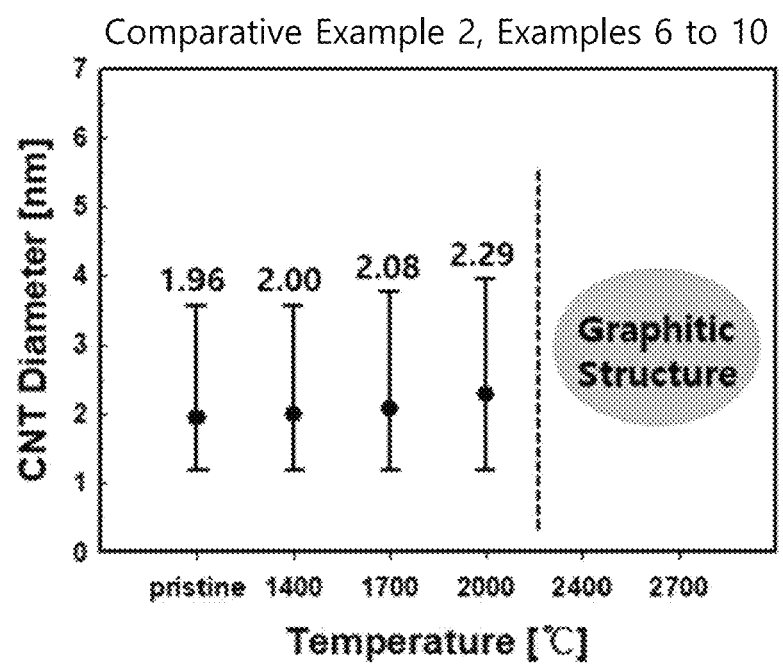
FIG. 5A and FIG. 5B show changes in carbon nanotube diameters for each heat treatment temperature of the carbon nanotube fibers manufactured in Comparative Example 2 and Examples 6 to 10.
Figure 5B:
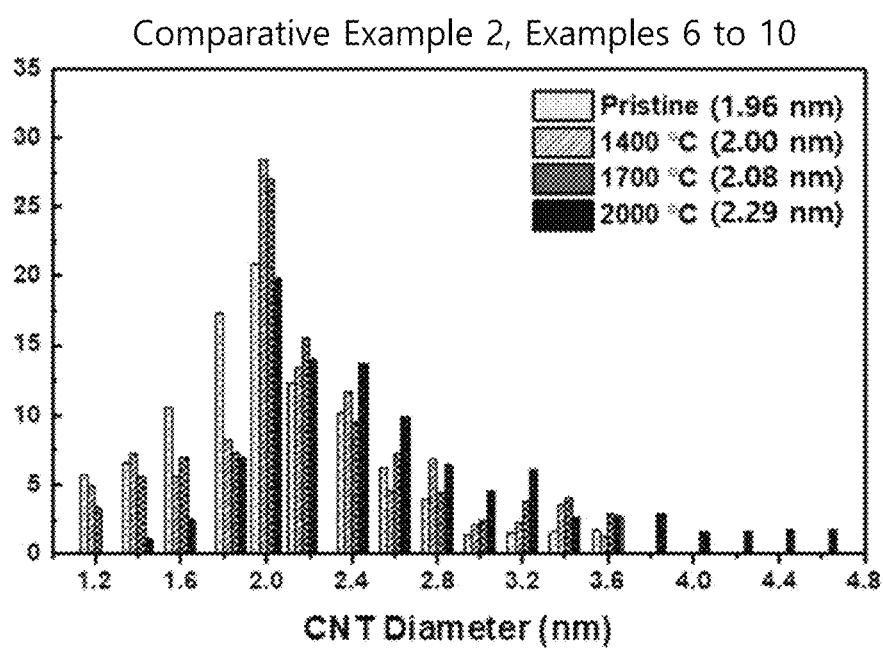

As shown in FIGS. 5A and 5B, it can be seen that, when the single-walled CNTs and the double-walled CNTs are mixed at a ratio of 55:45, diameters of the CNTs increase but do not significantly increase.

When the heat treatment temperature is 2,400° C. or higher, the inside of the fibers loses the CNT form and changes into the graphite form. Therefore, since the CNTs are almost nonexistent at the corresponding temperature or higher, the diameter of the CNTs is not indicated, but indicated by the graphitic structure.

Figure 7:
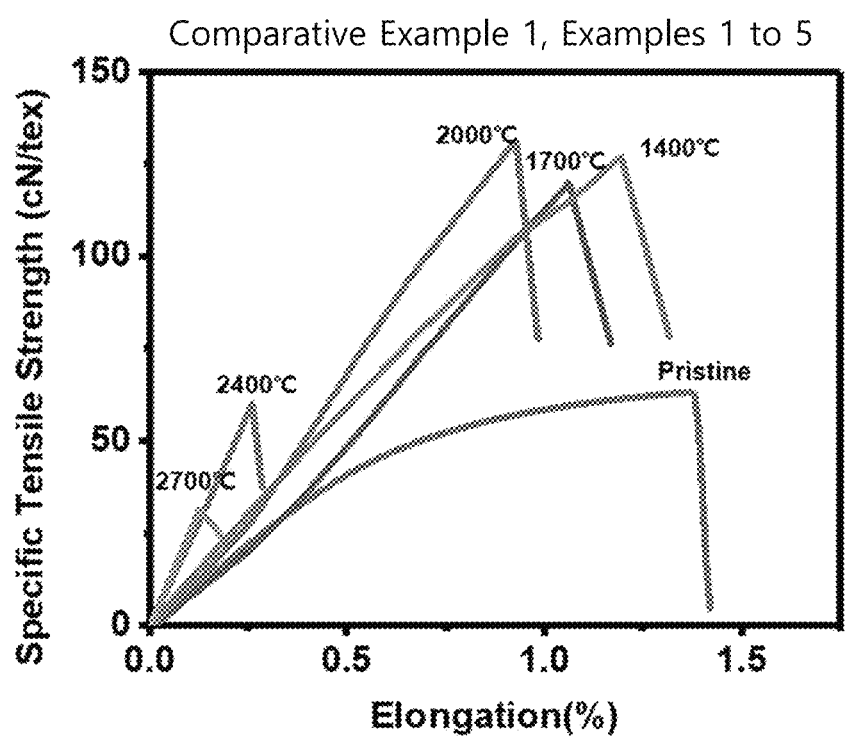
FIG. 7 is a graph showing changes in strength and elongation for each heat treatment temperature of the carbon nanotube fibers manufactured in Comparative Example 1 and Examples 1 to 5.
Figure 8:
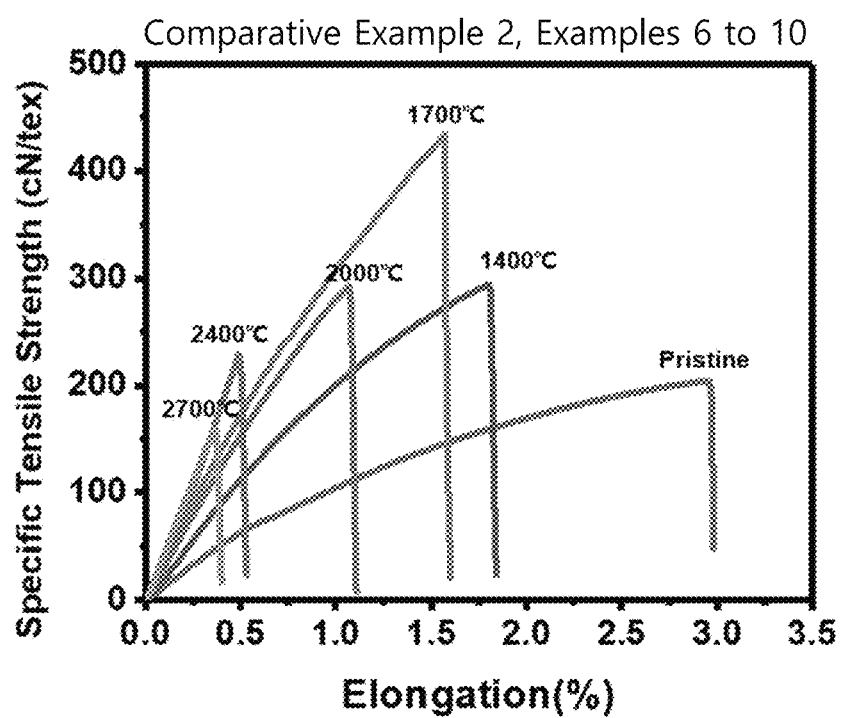
FIG. 8 is a graph showing changes in strength and elongation for each heat treatment temperature of the carbon nanotube fibers manufactured in Comparative Example 2 and Examples 6 to 10.
Figure 9:
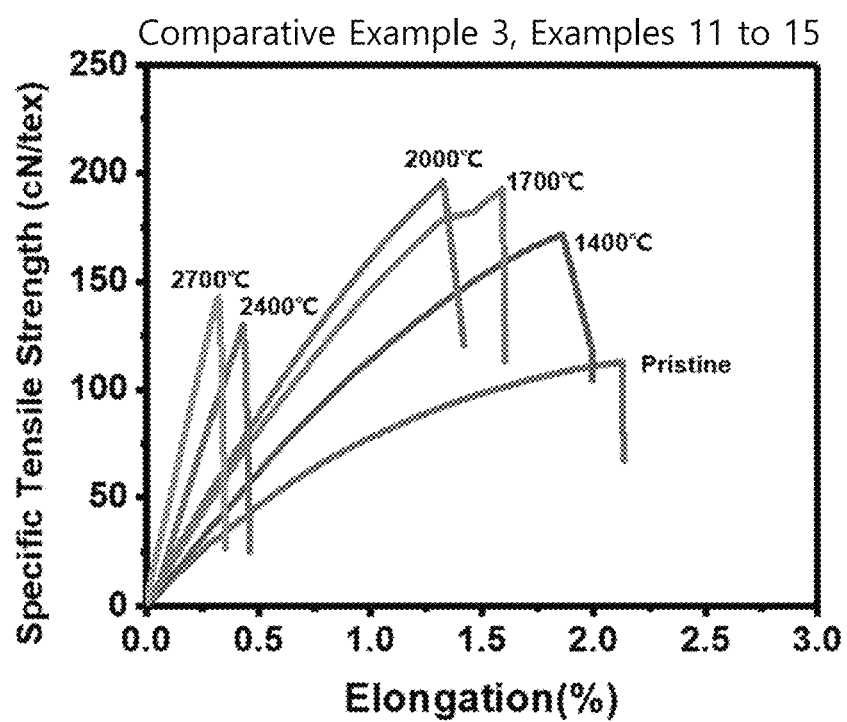
FIG. 9 is a graph showing changes in strength and elongation for each heat treatment temperature of the carbon nanotube fibers manufactured in Comparative Example 2 and Examples 11 to 15.

Evaluation Example 5: Measurement of Specific Tensile Strength, Linear Density, Specific Tensile Modulus, Specific Electrical Conductivity, and Thermal Conductivity After measuring specific tensile strength, linear density, specific tensile modulus, specific electrical conductivity, and thermal conductivity of the carbon nanotube fibers manufactured according to Examples 1 to 15 and Comparative Examples 1 to 3, the measurement results are shown in Table 1 and FIGS. 7 to 9.

The above-described physical properties were measured using FAVIMAT+ (short fiber property measuring instrument). This equipment is equipment which measures tensile strength (N) and linear density (tex) to calculate specific tensile strength (N/tex).

FAVIMAT can calculate the linear density (μ) by using the equation $$f = \frac{1}{2L}\sqrt{\frac{T}{\mu}}$$

using the natural frequency possessed by the fibers. Here, f is the natural frequency [Hz], T is the tension [N], and L is the length [km] of the fibers. After measuring the linear density in this manner, the strength is measured through a tensile test. It is equipment which can know the specific tensile strength by calculating the measured strength and linear density.

Specific Tensile Strength (N/tex) is a value calculated using the linear density calculated by FAVIMAT and the strength (Force, N) measured in the tensile test.

Elongation also refers to the maximum elongation until the fibers are broken through the tensile test of the fibers in FAVIMAT. The elongation is represented by %.

Specific Tensile Modulus (N/tex) represents a slope in a graph of the elongation and strength. Usually, the specific tensile modulus indicates an initial slope value, and is indicated by calculating a section in which the strength is constantly increased according to the elongation.

Specific Electrical Conductivity (S·m²/kg) was calculated according to the calculation formula by measuring the resistance. After putting a silver paste on the carbon nanotube fibers at 1 cm intervals, the resistance was measured. And then, the linear density measured by FAVIMAT was calculated according to cm/(Ω·tex). Here, L is the measured length of the carbon nanotube fibers.

Thermal conductivity (W/m·K) was measured using one dimensional self-heating method. After fixing the carbon nanotube fibers to a substrate for measurement, a current was flown to the carbon nanotube fibers in a high vacuum atmosphere to generate Joule heat so that a temperature distribution was created in the fibers. The temperature changes due to Joule heat of the fibers can be measured by changes in the resistance of the fibers according to the temperature. The average temperature increases of the fibers due to Joule heat are represented by $$\Delta T = \frac{QL}{12kA},$$

where Q is the Joule heat given to the carbon nanotube fibers.

Evaluation Example 6: Thermogravimetric Analysis for Each Carbon Nanotube

Figure 10:
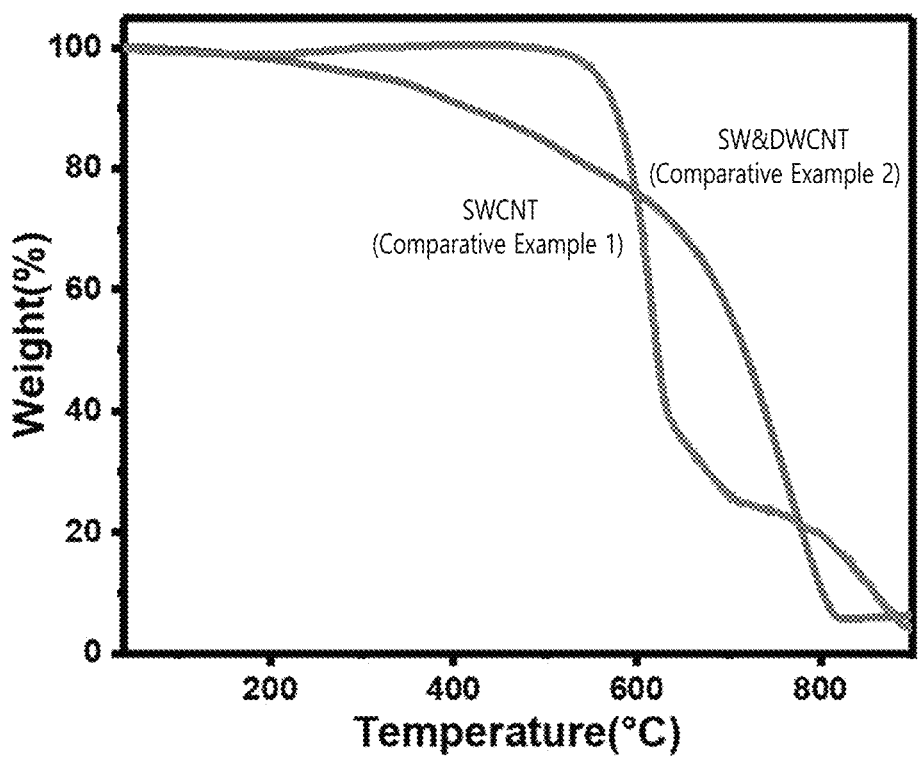
FIG. 10 is thermogravimetric analysis results of the carbon nanotubes used in manufacturing of the carbon nanotube fibers of Comparative Examples 1 and 2.

After performing thermogravimetric analysis of the carbon nanotubes used to manufacture the carbon nanotube fibers of Comparative Examples 1 and 2, thermogravimetric analysis results are shown in FIG. 10. The thermogravimetric analysis is a method of quantitatively measuring the purity of the carbon nanotubes through the remaining amount of the carbon nanotubes remained after decomposing the carbon nanotubes by heat by setting the temperature increasing rate in the air to 10° C. per minute and increasing the temperature to 900° C.

As shown in FIG. 10, it has been confirmed as the thermogravimetric analysis results that the single-walled carbon nanotubes used in Comparative Example 1 had a purity of 95% by weight or more, and the carbon nanotubes having the single-walled carbon nanotubes and the double-walled carbon nanotubes used in Comparative Example 2 mixed therein had a purity of 97% by weight or more.

Evaluation Example 7: Density Measurement of Carbon Nanotube Fibers

After measuring the density of the carbon nanotube fibers manufactured according to Examples 1 to 15 and Comparative Examples 1 to 3, measurement results are shown in Table 1. A density gradient tube, which is a method of measuring the extent to which the fibers are located in the solvents due to the difference in density by mixing two solvents having different densities, was used. The density gradient tube is equipment which creates environments with different densities within one solvent by mixing benzene and tetrabromomethane solvent in an appropriate ratio. For the corresponding density, the difference in density was distinguished using reference beads for which the density had already been known. After putting the carbon nanotube fibers in the prepared solvent, the density was measured by observing the position of the fibers after allowing the fibers to be left to stand for at least 6 hours so that they could be accurately positioned at the corresponding density.

TABLE 1

| | Heating temperature (° C.) | Specific tensile strength (N/tex) | Specific tensile modulus (N/tex) | Strength (GPa) | Elastic modulus (GPa) | Thermal conductivity (W/m · K) | Density (g/cm³) |
|---|---|---|---|---|---|---|---|
| Example 1 | 1400 | 1.16 | 137 | 1.53 | 181 | — | 1.32 |
| Example 2 | 1700 | 1.25 | 103 | 1.69 | 139 | — | 1.35 |
| Example 3 | 2000 | 1.31 | 172 | 1.73 | 227 | — | 1.32 |
| Example 4 | 2400 | 0.50 | 162 | 0.82 | 264 | — | 1.63 |
| Example 5 | 2700 | 0.33 | 184 | 0.59 | 331 | 310 | 1.80 |
| Example 6 | 1400 | 2.73 | 252 | 5.13 | 474 | — | 1.88 |
| Example 7 | 1700 | 4.25 | 368 | 7.01 | 607 | 437 | 1.65 |
| Example 8 | 2000 | 2.93 | 322 | 4.63 | 509 | — | 1.58 |
| Example 9 | 2400 | 2.22 | 420 | 3.17 | 601 | — | 1.43 |
| Example 10 | 2700 | 1.53 | 445 | 2.89 | 841 | 490 | 1.89 |
| Example 11 | 1400 | 1.34 | 83 | 2.47 | 153 | — | 1.84 |
| Example 12 | 1700 | 1.39 | 88 | 2.49 | 158 | — | 1.79 |
| Example 13 | 2000 | 1.54 | 89 | 2.63 | 152 | — | 1.71 |
| Example 14 | 2400 | 1.58 | 219 | 2.54 | 353 | — | 1.61 |
| Example 15 | 2700 | 1.24 | 535 | 2.43 | 1,049 | 500 | 1.96 |

TABLE 1-continued

|  | Heating temperature (° C.) | Specific tensile strength (N/tex) | Specific tensile modulus (N/tex) | Strength (GPa) | Elastic modulus (GPa) | Thermal conductivity (W/m · K) | Density (g/cm³) |
|---|---|---|---|---|---|---|---|
| Comparative Example 1 | — | 0.62 | 138 | 0.93 | 207 | 260 | 1.50 |
| Comparative Example 2 | — | 2.10 | 155 | 4.03 | 298 | 380 | 1.92 |
| Comparative Example 3 | — | 1.10 | 86 | 2.31 | 181 | 400 | 2.10 |

According to the present disclosure, a carbon nanotube fiber having improved physical properties and a method for manufacturing the same are provided.

Although preferred embodiments according to the present disclosure have been described with reference to the drawings and examples in the above description, these are merely exemplary, and those of ordinary skill in the art will be able to understand that various modifications and equivalent other embodiments are possible therefrom. Accordingly, the protection scope of the present disclosure should be defined by the appended claims.

What is claimed is:

1. A method for manufacturing a carbon nanotube fiber, the method comprising the steps of:
   liquid crystal spinning carbon nanotubes with a purity of 90% by weight or more to obtain a first carbon nanotube fiber; and
   heat-treating the first carbon nanotube fiber at 2,200 to 3,000° C. under an inert gas atmosphere to obtain a second carbon nanotube fiber;
   wherein the second carbon nanotube fiber has a density of 1.0 to 2.5 g/cm³;
   wherein the carbon nanotubes include 20 to 100% by weight of double-walled carbon nanotubes;
   wherein the second carbon nanotube fiber has a carbon nanotube diameter of 1.02 to 1.5 times that of the first carbon nanotube fiber;
   wherein the second carbon nanotube fiber has a specific tensile modulus of 2 to 10 times that of the first carbon nanotube fiber; and
   wherein the second carbon nanotube fiber has a thermal conductivity of 1.1 to 3 times that of the first carbon nanotube fiber.

2. The method of claim 1, wherein the first carbon nanotube fiber has a density of 0.6 to 2.3 g/cm³, and the second carbon nanotube fiber has a density of 1.5 to 2.5 g/cm³.

3. The method of claim 2, wherein at least a portion of the carbon nanotubes is graphitized by the heat treatment.

4. The method of claim 3, wherein the heat treatment temperature is 2,500 to 3,000° C.

5. The method of claim 1, wherein the carbon nanotubes are purified by chemical purification.

6. The method of claim 5, wherein the chemical purification comprises the steps of: (i) treating carbon nanotubes using a strong acid alone or a mixture of the strong acid and hydrogen peroxide or ammonium hydroxide ($NH_4OH$); (ii) removing a metal catalyst in the carbon nanotubes by gas phase reaction of a halogen element compound; or (iii) combining them.

7. The method of claim 1, wherein the step of obtaining the first carbon nanotube fiber comprises a step of the liquid crystal spinning a dope containing the carbon nanotubes and a super strong acid.

8. The method of claim 7, wherein the super strong acid is one or more selected from chlorosulfonic acid, sulfuric acid, fuming sulfuric acid, fluorosulfonic acid, trifluoroacetic acid, trifluoromethanesulfonic acid, fluoroantimonic acid, and carborane acid.

9. The method of claim 7, further comprising a step of oxidizing the carbon nanotubes by heating the carbon nanotubes under an oxygen atmosphere in order to increase dispersion of the carbon nanotubes in the dope.

10. The method of claim 1, wherein the first carbon nanotube fiber has a specific tensile strength of 0.50 N/tex or more and a specific tensile modulus of 50 N/tex or more.

* * * * *